Figure 1:
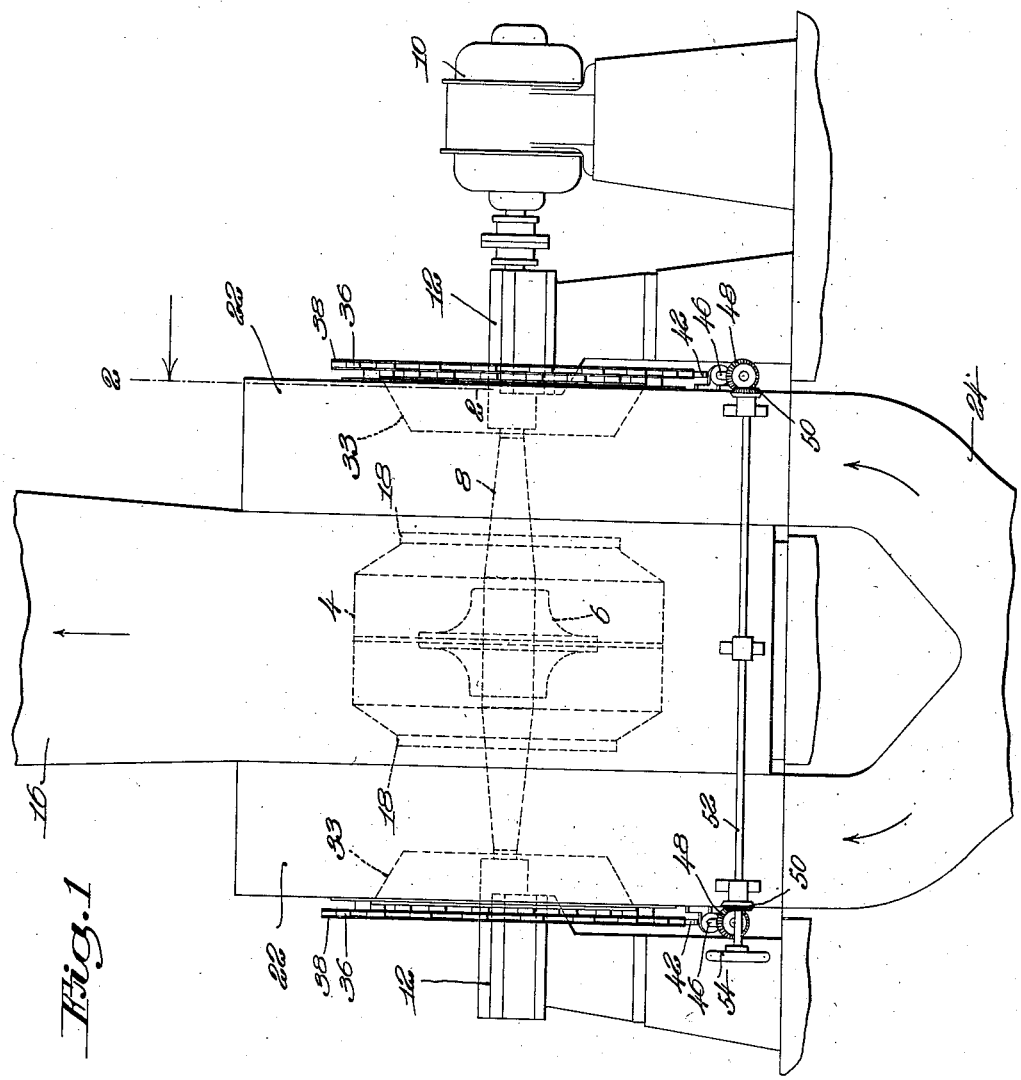

Feb. 23, 1932.　　　　H. F. HAGEN　　　　1,846,863
FAN AND METHOD OF OPERATING THE SAME

Filed Aug. 4, 1927　　　3 Sheets-Sheet 1

Feb. 23, 1932. H. F. HAGEN 1,846,863

FAN AND METHOD OF OPERATING THE SAME

Filed Aug. 4, 1927 3 Sheets-Sheet 3

Witness
Frederick S. Greenleaf

Inventor
Harold F. Hagen
by his attorneys
Van Everen, Fish, Hildreth, & Cary

Patented Feb. 23, 1932

1,846,863

UNITED STATES PATENT OFFICE

HAROLD F. HAGEN, OF DEDHAM, MASSACHUSETTS, ASSIGNOR TO B. F. STURTEVANT COMPANY, OF HYDE PARK, MASSACHUSETTS, A CORPORATION OF MASSACHU-SETTS

FAN AND METHOD OF OPERATING THE SAME

Application filed August 4, 1927. Serial No. 210,666.

The present invention relates to fans and methods of operating the same.

The objects of the present invention are to provide a fan and method of operating the same in which the power and the speed may be efficiently varied independently of each other, and particularly to provide a fan and method in which the power may be varied at constant speed while maintaining a high efficiency.

In a fan of the ordinary type, the power required for operation varies substantially as the cube of the speed. This follows from the fact that the force applied by the fan to the moving fluid is proportional to the square of the speed, and the power varies as the product of the force and velocity. The interdependence of speed and power gives rise to many difficulties, particularly when varying demands of power are made upon the fan at constant speed or when for any reason it is desired efficiently to regulate the volume of discharge fluid independently of the speed. The usual draft appliances for power plant operation may be considered as an important example of a condition where demands are made for variable power. The draft necessarily varies as the load on the plant changes and the fan is therefore called upon to deliver varying volumes of air. However, if the fan is driven by a constant-speed device, such as an alternating-current electric motor, the power required to operate the fan is practically fixed and may be nearly as great at light loads as at full load. The volume of air delivered by the fan may be controlled by throttling but this type of control calls for a considerable waste of energy, the excess of power which is not necessary at light loads being dissipated by the throttling action. Heretofore, the only efficient method of control consisted in varying the speed, a method which while feasible for fans operated from a turbine or a direct-current motor, is not readily applicable to alternating current operation. Inasmuch as the alternating-current induction motor affords the most economical source of driving energy both in initial cost and in operation, it is desirable to provide means for efficiently varying the volume of discharge fluid independently of the speed, thereby permitting operation of the fan with a small amount of power when a decreased draft is demanded.

According to the present invention, the volume of the discharge fluid and the power to operate the fan are controlled by varying the force which the fan applies to the moving fluid. In its simplest and best form yet devised, the fan is provided with an inlet chamber having controllable means for imparting to the fluid a variable velocity of spin in the direction of rotation of the fan blades. The force which the fan exerts on the fluid depends upon the relation between the blade velocity and the spin velocity of the fluid and as the spin velocity approaches a value approximating the velocity of the blades, the fan becomes less and less effective to exert any force on the fluid. This construction while useful in any installation where independent control of speed and power is desirable, is particularly advantageous for use in draft systems for power plants. The fan may be driven by a constant-speed motor, and at any load less than full load, the power required to drive the fan may be reduced by varying the velocity of spin of the entering air. This control of power by variation of the force exerted by the blades, effects a substantial economy in operation as compared with throttling methods and eliminates the necessity of expensive speed control devices for the motor.

Figure 2:
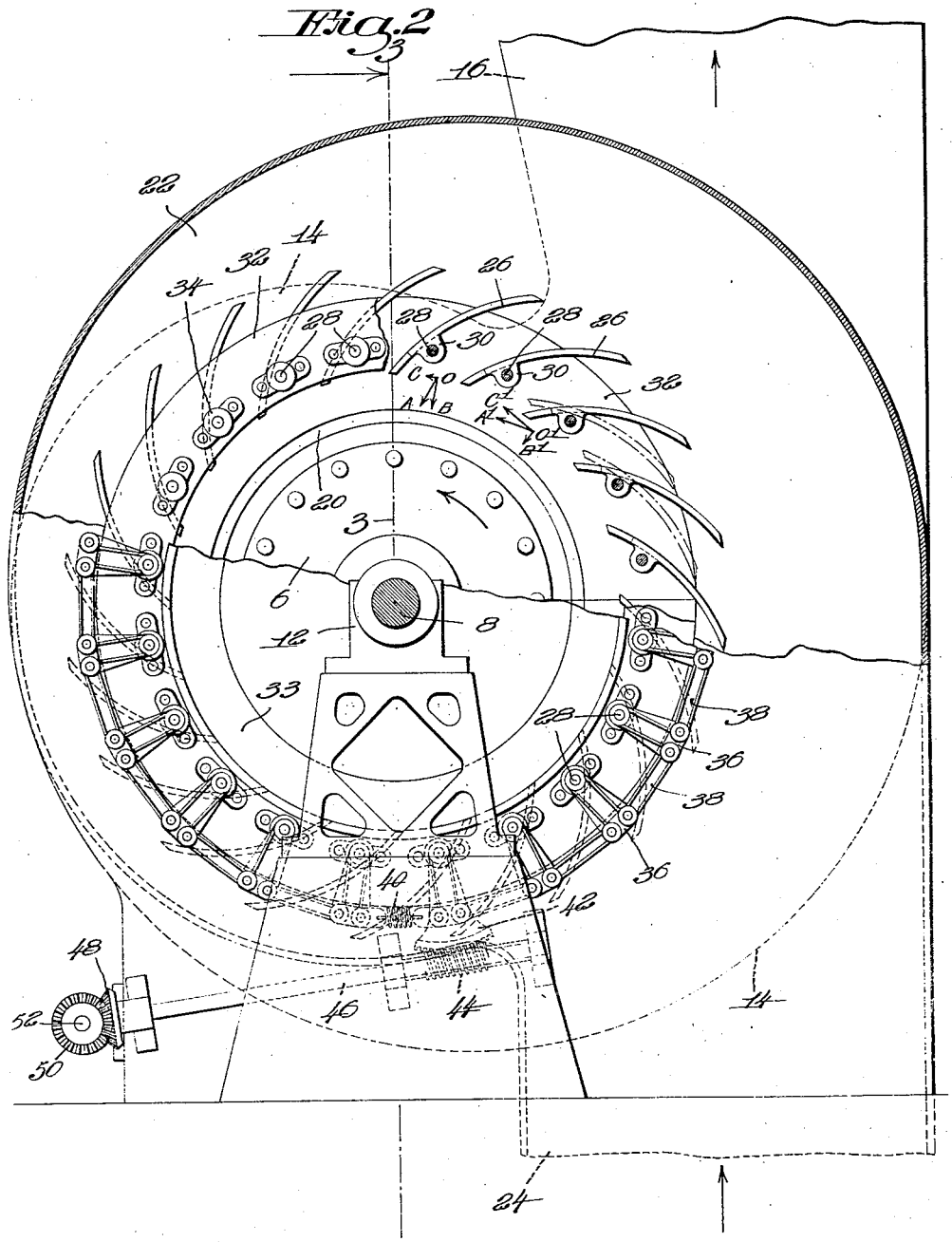
Figure 3:
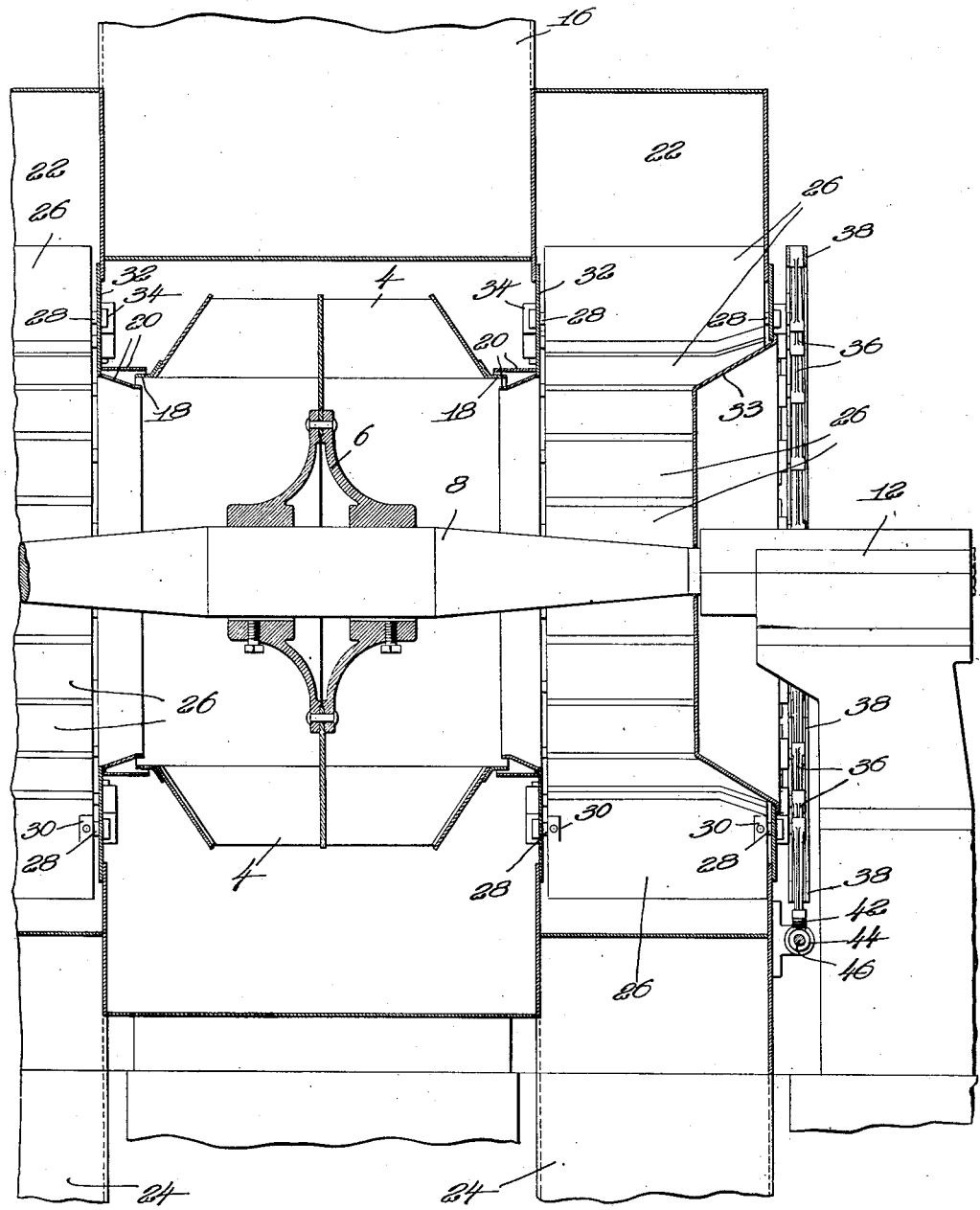

In the accompanying drawings illustrating the preferred form of the invention, Fig. 1 is a front elevation of the fan and motor; Fig. 2 is an elevation partly in section on line 2—2 of Fig. 1 on an enlarged scale; and Fig. 3 is a section of a part of the apparatus taken on the line 3—3 of Fig. 2, on the same enlarged scale.

The invention as herein illustrated and described is embodied in a centrifugal fan which is driven by an alternating-current constant-speed motor. The fan comprises a rotor having a plurality of blades 4 secured in any usual or preferred manner to hubs 6 which are mounted on the shaft 8. The shaft is driven by the induction motor 10 and is journaled in bearings 12. The rotor is received within a scroll shown in dotted outline in Fig. 2 at 14 which delivers the fluid into the outlet chamber 16. The blades rotate in the direction indicated by the curved arrow in Fig. 2. In order to prevent leakage of the air around the rotor, the latter is provided with annular flanges 18 which rotate between inwardly extending flanges 20 on the casing.

The air is admitted to the fan through inlet chambers 22 arranged one on each side of the rotor and connected into a common supply conduit 24. Each inlet chamber is in the form of a scroll as shown in Fig. 2.

Inasmuch as the inlet chambers are of similar formation, a description of one only will suffice. Received within and extending across the inlet chamber are a plurality of pivoted curved vanes 26 which are fixedly secured upon the pivoted studs 28 arranged in a circle around the eye of the fan. Each vane is provided on opposite sides with ears 30 in which the studs 28 are secured. The studs on opposite sides of each vane are received in mounting rings 32 which are attached to opposite sides of the inlet casing, the ends of the studs being journaled in bearing blocks 34 which are secured to the rings 32. Each vane is cut off at its outer corner to clear the inlet cone 33. Each vane is of cylindrical contour, that is to say, it has a surface in which all of the elements are parallel to each other and to the axis of the rotor. All of the vanes of each set are articulated by means of cranks 36 attached to the ends of the studs extending through the outside of the casing and the cranks are connected together by means of links 38 pivoted at their ends to the cranks. The links form a polygon around the fan casing, each link connecting parallel pivot radii. A coiled spring 40 interposed at one point between adjacent rods takes up lost motion. To one of the studs is secured a worm segment 42 which meshes with a worm 44 on a shaft 46. Both of the shafts 46 on opposite sides of the fan are caused to be simultaneously rotated by means of bevel gears 48 mounted on the ends of the shafts 46 and meshing with similar bevel gears 50 on an actuating rod 52 extending transversely across the apparatus. The rod 52 may be rotated to move the vanes to a desired position by any suitable means, a hand wheel 54 being shown in Fig. 1. In commercial power plant operation, however, the rod 52 may be operated by any of the usual automatic mechanisms which function upon variations in the load.

The fluid entering the inlet circulates around the inlet scroll and passes between the vanes 26 into the eye of the fan with a velocity having magnitude and direction determined by the position of the vanes. For example, when the vanes are in the position illustrated in full lines in Fig. 2, the fluid is directed into the eye of the fan with a velocity which is made up largely of radial and axial components, there being only a slight component in a peripheral direction. The vanes are placed in this position when a demand for a considerable volume of air is placed upon the fan. From this position, the vanes may either be opened to a greater extent or they may be partially closed. A position of partial closure is indicated for two of the vanes in dot and dash lines, this position being assumed when the draft is to be considerably reduced.

The principles of operation will be described by the aid of the small vector diagrams of Fig. 2, which show the magnitude and direction of the components of velocity of the entering air, as projected into the plane of rotation of the fan. The diagram for the full line position of the vanes is drawn upon the origin O and for the dot and dash position of the vanes on the origin O'. Considering first the conditions existing when the vanes are in the full line position, the air leaving the vanes will have a velocity represented by the vector OA. This vector is resolved into two components, namely, a radial component OB and a component OC perpendicular to the radius. There will also be an axial component which does not appear on the projected diagram. The vector OC represents the spin velocity which is in the direction of rotation of the blades and which is the dominating factor for determining the power of the fan. The vector diagram for the partially closed position of the vane is similarly formed on the origin O' and shows the absolute velocity of the entering air as O'A' which is resolved into the radial and spin components O'B' and O'C' respectively. It will be seen that the spin component in the latter case, is much greater than in the former, while the radial component has been correspondingly reduced. At intermediate positions between the two positions illustrated in Fig. 2, the spin component will assume a progressively changing value.

The force exerted and hence the work done by the fan on the fluid depends upon the relative velocity of the fluid with respect to the blades. It will be appreciated that in order for any useful work to be done, the fluid must have a component of velocity relative to the blades which is in or opposite to the direction of rotation. If a condition could be realized in which the spin velocity were exactly equal to the linear velocity of the blades, the relative velocity in the direction of rotation would be zero and the blades would be ineffective to apply any force to the fluid. The work done by the fan would therefore be zero and the power required to operate it would be merely that necessary for supplying the mechanical losses. Although this limiting condition would be of little value even if it could be realized, the present invention permits admission of air with a spin component which may be nearly equal to the blade velocity. In these cases, the relative velocity in the direction of rotation is small and the power is consequently small. This condition is of considerable practical value in operation at a constant speed when a reduced volume of air is required. As demands are made for an increased draft, the vanes may be opened to a greater extent and the spin velocity will decrease correspondingly, thereby increasing the force exerted by the blades and the work done by the fan. In the wide open position of the vanes, when the spin component is negligibly small, the operation is similar to that of the ordinary centrifugal fan. For any position of the vanes between wide open and nearly closed position, corresponding to maximum demands down to very light loads, the fan operates at a high efficiency and without the loss of power which the ordinary throttling action entails.

The construction is such that the adjustment of output is obtained primarily through the variation of spin velocity and without appreciable throttling even when the vanes are closed to a considerable extent. This effect is brought about by such an arrangement of the vanes that a movement thereof from any position produces a change in the spin component of velocity of the fluid without proportionately increasing the total linear velocity of the fluid passing through the vanes or proportionately reducing the area through which the fluid passes. It will be noted that the vanes are so constructed that when completely closed, they overlap in such a way as to form a practically continuous surface. In other words, the fluid directing surfaces of two adjacent vanes overlap in closed position and are substantially parallel for all other positions, that is, they are as nearly parallel as they can be made having regard for the angular displacement of the vanes about the periphery of the eye. As the vanes close, the fluid directing surfaces come into closer parallelism until when completely closed, they form a complete ring about the eye of the fan. The practical parallelism of the surfaces of adjacent vanes forms between them a fluid directing throat of substantially uniform cross-sectional area, which assures the entrance of fluid into the fan with the proper and definite angle, approaching tangential admission as the vanes are closed. The formation of the vanes as individual portions of a substantially continuous regular surface when closed makes for the condition of predominant control by a spin velocity without appreciable throttling and is also conductive to efficiency in that the fluid enters through the several passages along such paths as to merge the individual flows together without eddying.

Although the invention has been illustrated and described as embodied in a fan adapted to run under variable power at constant speed, it will be understood that the invention is not to be considered as limited to this particular type of installation but may include constructions wherein either the power or the speed may be controlled independently of the other.

What is claimed is:

1. A method of operating a centrifugal fan which consists in rotating the fan wheel at constant speed and controlling the output of the fan in accordance with the variations in demand thereon by supplying fluid to the fan with a spin component of velocity in the direction of rotation of the wheel, adjusting the spin through a range to produce variations in output from substantially the full capacity of the fan to a minimum capacity thereof with a substantially tangential admission of fluid, said variation from maximum output to lower outputs being effected by increasing the spin component while reducing the area through which the fluid passes at a rate not proportionately greater than the rate of increase of the spin component.

2. The combination with a constant speed motor, of a centrifugal fan having a rotor, an inlet, a plurality of vanes in the inlet forming fluid directing passages to admit fluid to the rotor with a spin component of velocity in the direction of rotation of the rotor, the vanes being adjustable to vary the output of the fan through a range from maximum capacity with the vanes open to a minimum capacity with a substantially tangential admission of fluid when the vanes are closed, adjacent vane surfaces continuously approaching parallelism and having extended overlapping portions shaped to define passages of substantially uniform cross-section as the vanes are moved toward closed position.

3. The combination with a constant speed motor, of a centrifugal fan having a rotor, a scroll inlet having an eye, a plurality of vanes in the inlet forming fluid directing passages to admit fluid to the rotor with a spin component of velocity in the direction of rotation of the rotor, pivots for the vanes surrounding the eye, the vanes being concave inwardly throughout and adjustable to vary the output of the fan through a range from maximum capacity with the vanes open to a minimum capacity with a substantially tangential admission of fluid when the vanes are closed, adjacent vane surfaces continuously approaching parallelism and having extended overlapping portions to define passages of substantially uniform cross section as the vanes are moved toward closed position.

In testimony whereof I have signed my name to this specification.

HAROLD F. HAGEN.

DISCLAIMER 1,846,863.—*Harold F. Hagen*, Dedham, Mass. FAN AND METHOD OF OPERATING THE SAME. Patent dated February 23, 1932. Disclaimer filed March 6, 1942, by the assignee, *B. F. Sturtevant Company*.
Hereby enters this disclaimer to claim 1 of said patent.
[*Official Gazette April 7, 1942.*]